US006927685B2

(12) United States Patent
Wathen

(10) Patent No.: US 6,927,685 B2
(45) Date of Patent: *Aug. 9, 2005

(54) REMOTE CONTROL SYSTEMS WITH AMBIENT NOISE SENSOR

(76) Inventor: Douglas L. Wathen, 8585 Talladay, Whittaker, MI (US) 48190

( * ) Notice: Subject to any disclaimer, the term of this patent is extended or adjusted under 35 U.S.C. 154(b) by 0 days.

This patent is subject to a terminal disclaimer.

(21) Appl. No.: 10/817,262

(22) Filed: Apr. 2, 2004

(65) Prior Publication Data

US 2004/0189463 A1 Sep. 30, 2004

Related U.S. Application Data

(63) Continuation of application No. 10/052,358, filed on Oct. 25, 2001, now Pat. No. 6,744,364.

(51) Int. Cl.[7] .................................................. H04Q 7/00
(52) U.S. Cl. .............................. 340/539.1; 340/426.13; 340/426.18; 340/426.23; 340/426.36; 340/539.11
(58) Field of Search .......................... 340/539.1, 425.5, 340/426.1, 435, 457, 457.2, 459, 460, 461, 686.1, 686.6, 326, 328, 329, 332, 426.13, 426.18, 426.22, 426.23, 426.36, 539.11

(56) References Cited

U.S. PATENT DOCUMENTS

| 5,382,941 | A | 1/1995 | Arzoumanian | 340/426 |
| 5,576,685 | A | 11/1996 | Saito | 340/384.1 |
| 5,933,081 | A | 8/1999 | Jones | 340/539 |
| 6,028,537 | A | 2/2000 | Suman et al. | 340/988 |
| 6,049,268 | A | 4/2000 | Flick | 340/425.5 |
| 6,075,454 | A | 6/2000 | Yamasaki | 340/825.31 |
| 6,108,271 | A | 8/2000 | Junkin | 367/127 |
| 6,112,152 | A | 8/2000 | Tuttle | 701/115 |

Primary Examiner—Daryl C Pope
(74) Attorney, Agent, or Firm—Gifford, Krass, Groh, Sprinkle, Anderson & Citkowksi, P.C.

(57) ABSTRACT

A remote control system includes a remote control transmitter that transmit a signal and a receiver than can receive the signal from the transmitter. A control device performs a function having a first and a second option. The control device responds to the signal received by the receiver and performs the first option if the distance between the remote control transmitter and the receiver is greater than a particular distance and performs a function based on the ambient noise level.

15 Claims, 2 Drawing Sheets

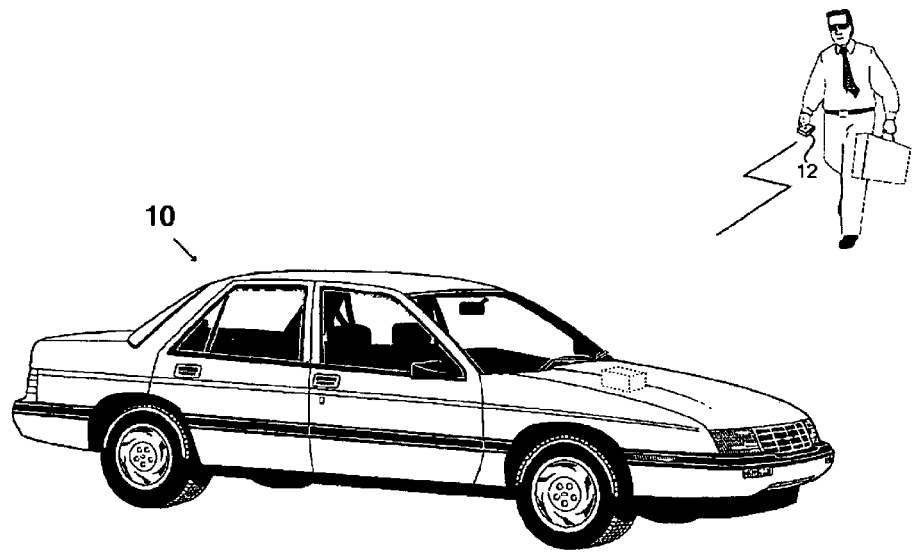
FIG - 1
FIG - 2
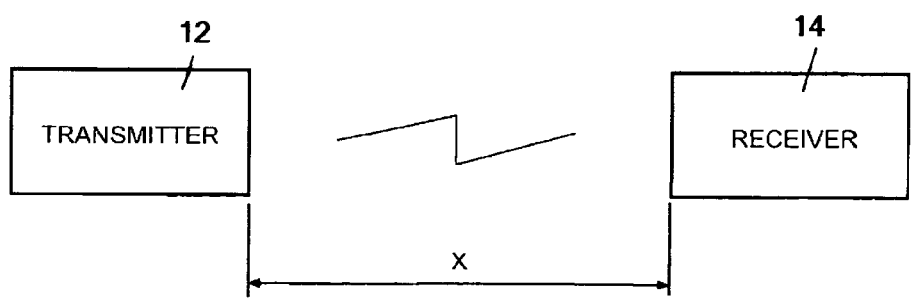

REMOTE CONTROL SYSTEMS WITH AMBIENT NOISE SENSOR

REFERENCE TO RELATED APPLICATIONS

This patent application is a continuation of U.S. patent application Ser. No. 10/052,358, filed Oct. 25, 2001 now U.S. Pat. No. 6,744,364, the contents of which are incorporated in their entirety herein by reference.

FIELD OF THE INVENTION

The present invention relates generally to remote control devices and, more specifically, to a remote control system in which one or more functions of the system are affected by the ambient noise level.

BACKGROUND OF THE INVENTION

Remote controls, for everything from televisions to vehicle alarm systems to ceiling fans, have become ubiquitous. The remote control systems allow an operator to control the functions of a variety of devices from a remote position. While the primary benefit of remote control systems is convenience, the systems also provide increased safety and functionality. For example, many automobiles are equipped with remote locking and unlocking systems and/or remote activated alarm systems. In these systems, a small remote control, often called a key fob, with one or more buttons, is operable to control locking and unlocking of the vehicle doors and/or arming and disarming of the alarm system. Remote unlocking of the vehicle doors is certainly more convenient than using a traditional key to unlock the doors. However, the system also provides safety benefits. A person walking alone at night may push "unlock" on the remote to unlock the car door as they approach the car. This significantly reduces the amount of time required to enter the car and reduces the time during which the person is exposed to potential risk. Also, in many vehicles, remote locking or unlocking causes other functions to be activated. For example, many vehicles illuminate interior lighting when the vehicle is remotely unlocked. This allows the owner to easily see whether the car has been tampered with and also helps in locating the vehicle. Some vehicles illuminate exterior lighting or sound a signal, such as the vehicle horn, during either locking or unlocking. These functions serve several purposes. First, the visual or audio signal helps the user to locate their vehicle. Additionally, the light or sound may serve to scare away undesirable characters who may be near the vehicle. Finally, the audible or visual signal helps to confirm that the signal from the remote control has been received by the vehicle.

A shortcoming of current remote control systems is that the systems are incapable of adjusting their function based on the distance between the remote control and the receiver. Remote control unlocking and locking systems for vehicles serve as an excellent example of why this shortcoming is undesirable. In vehicles which provide an audible alert when the vehicle has been locked or unlocked, the audible alert is of a constant volume level. Automakers attempt to choose a sound and volume level which serves to alert the user to the functioning of the remote control under a variety of conditions. However, this nonadjustable level is always a compromise. In a noisy environment, such as along a city street, the standard volume level of an audible signal associated with locking or unlocking may be insufficient to overpower the background sound. Also, if the user is far from the vehicle when using the remote, the audible signal may be insufficient to reach them at this distance. This is especially a problem in that the effectiveness of the remote control drops as the distance increases. When the user is far from the vehicle, it is more important to receive a confirmation that the signal has been received so that the user does not repeatedly activate the remote control. At the opposite end of the spectrum, preset audible signals are often too loud in some settings. A user who parks in a small enclosed parking area, such as a parking garage, or in a quiet residential area, may find that the audible alert associated with remote locking of their vehicle is embarrassingly loud. In light of the above, there is a need for remote control systems that adjust their function in response to distance between the remote control and the receiver.

SUMMARY OF THE INVENTION

The present invention provides a remote control system wherein one or more aspects of the system are adjusted according to the distance between the remote control transmitter and receiver. The system includes a remote control transmitter operable to transmit a signal and a receiver operable to receive the signal from the remote control transmitter. The system also includes a control device which is configured to perform a function having a first and second option. The control device is responsive to the signal received by the receiver and operable to perform the first option with the distance between the remote control transmitter and the receiver is greater than the first predetermined distance and to perform the second option if the distance between the remote control and transmitter and the receiver is less than the second predetermined distance.

BRIEF DESCRIPTION OF THE DRAWINGS

FIG. 1 is a perspective view of a vehicle including a remote control receiver and a driver with a remote control transmitter;

FIG. 2 is a diagram showing a transmitter and a receiver with an adjustable distance X therebetween.

DETAILED DESCRIPTION OF THE PREFERRED EMBODIMENTS

Figure 3:
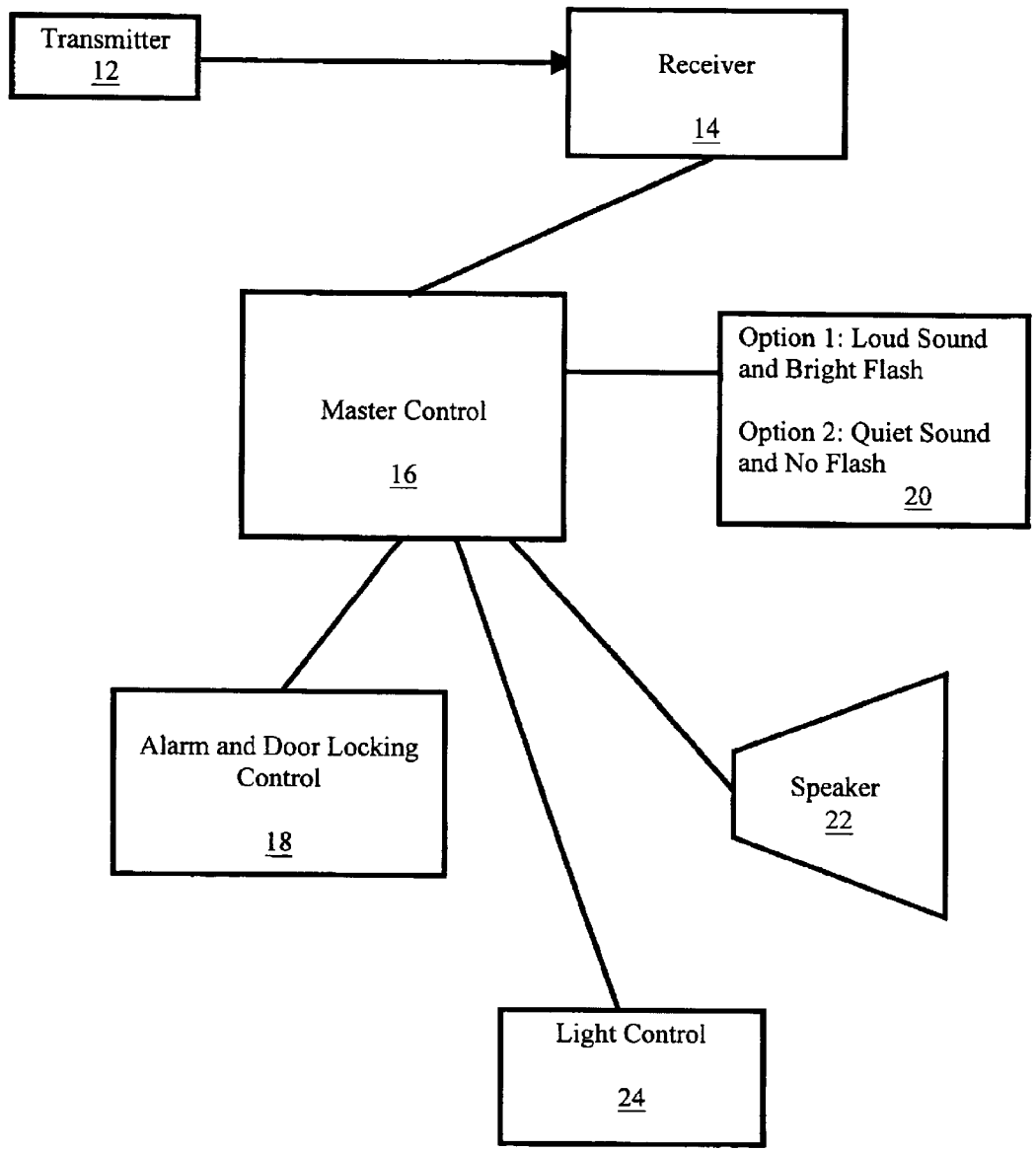
FIG. 3 is a block diagram showing components of one embodiment of the present invention.

According to the present invention, remote control systems are provided with the additional functionality that one or more functions of the remote control system may be altered based on the distance between the remote control and the receiver. An illustrative example of this system will be based on automobile remote locking and unlocking systems. As shown in FIG. 1, a vehicle 10 may be remotely locked and unlocked by a remote control 12. According to the present invention, the response of the automobile to a signal received from the remote control depends in part on the distance between the remote control and the vehicle. FIG. 2 shows a diagram with a remote control transmitter 12 and a remote control receiver 14. The distance between the transmitter 12 and the receiver 14 is indicated by X. Typically the distance X may be adjusted between the transmitter and the receiver.

In the present example, the automobile is capable of providing an audible alert, via sounding the vehicle horn or other sound producing device, in response to a signal received from the remote control. For example, when the lock button is pressed on the remote control, the vehicle locks its doors and sounds a short beep using the vehicle horn. According to this embodiment of the present invention, the volume of the beep depends on the distance between the remote control and the vehicle. When the remote control is at the limit of its range, far from the vehicle, the vehicle responds to a lock signal from the remote control by sounding a loud beep and locking the doors. This allows the user, located at a distance from the vehicle, to easily hear the audible signal. When the remote control is located closer to the vehicle, the vehicle responds to a lock signal by a correspondingly less loud beep.

According to one embodiment of the present invention, use of the remote control at a position very close to the vehicle results in no audible signal. That is, if the remote control is activated to send a lock signal to the vehicle when the remote control is located only a few feet from the vehicle, the vehicle responds by locking the doors but does not sound an audible alert. Typically, the sound of the lock cylinders locking the doors will be sufficient audible confirmation that the command has been carried out. This allows the user to select a silent mode for locking when they are in a quiet atmosphere. For example, when the user is parking in a quiet residential neighborhood, they may close the doors and then hold the remote close to the vehicle and press lock. This will cause the vehicle to lock its doors and not sound a possibly embarrassing audible signal. The same user, when parking their vehicle in the more typical noisy street atmosphere, simply presses the lock button on the remote control at any distance from the vehicle, within the range of the remote control. The vehicle will respond with an audible signal whose volume depends on the distance between the remote control and the vehicle. If the user has waited until they are far from the vehicle, a louder audible signal will be sounded. Alternatively, the length of audible signal sounded and/or the number of audible signals sounded may be adjusted based on distance.

As an alternative, visual indicators may also be adjusted based on distance of the remote control from the vehicle. On a vehicle that is equipped to flash its parking lights in response to a lock or unlock signal, the brightness and/or length of the flash, or number of flashes, may be adjusted based on the distance between the remote control and the vehicle. For example, when a user is attempting to find their vehicle in a parking lot, and they are far from the vehicle, pressing the remote causes the vehicle to flash its parking lights at full intensity and/or leave them on for a long time and/or flash the lights a large number of times. However, when the user is very close to the vehicle, no flash, a low intensity flash, and/or a short duration flash may be produced.

In another embodiment of the present invention, both an audible and visual indication may be adjusted based on the distance of the remote control from the vehicle. For example, if the remote is activated close to the vehicle, the confirmation signal is merely visual, consisting of a short and/or low intensity flash of light. At further distances, the visual confirmation may be supplemented by an audible signal from the vehicle horn or other means.

As will be clear to those of skill in the art, there are numerous ways in which distance between the remote control and the vehicle may be determined. As one example, signal strength may be used as an indicator of distance. For example, if the vehicle receives a very strong remote control signal, the remote control is determined to be close to the vehicle and a low intensity visual or auditory indication, or no visual or auditory indication, is triggered. Alternatively, when the remote control is at the limit of its range, the signal received by the vehicle will be much weaker. In this case, a higher intensity visual and/or auditory indication is triggered. Therefore, the strength of the confirmation auditory/visual is inversely proportional to remote control signal strength as received by the vehicle. As another approach, the vehicle remote control receiver may determine the distance between the remote control and the vehicle through timing pulses sent between the vehicle and the remote control. For example, a signal is first sent from the remote control the vehicle. A transceiver in the vehicle transmits a pulse signal back to the remote control. The remote control, which also incorporates a transceiver, receives the signal from the car and immediately retransmits a response signal. The time period between transmission of a signal by the vehicle and receipt of a response signal by the vehicle from the remote control is related to the distance between the remote control and the vehicle. The system may alternatively use the approach described in U.S. Pat. No. 6,108,271 to Junkin, the entire contents of which is incorporated herein by reference. The present invention may use any approach to determining distance, including determining relative positions (such as GPS). It should be noted that the term "distance" is used herein in a very broad sense. The system may not actually determine distance, such as a particular number of feet, but rather just sense relative strengths, or other factors related to distance.

Referring now to FIG. 3, a block diagram of one embodiment of the present invention will be discussed. Again, a transmitter 12 and a receiver 14 are shown, which may have a variable distance therebetween. A master control 16 is provided which communicates with the receiver 14 for determining when the receiver receives the signal from the transmitter. The master control in turn controls a function of the vehicle, such as the alarm and door locking control 18. By sending a signal from the master control to the alarm and door locking control, the master control 16 may control whether the doors are locked or unlocked and whether the alarm is armed, disarmed, or in some other mode. The master control is also operable to determine the distance between the transmitter 12 and receiver 14, or some factor related to the distance.

Box 20 lists two options for functions performed by the master control. Option 1 is listed as "loud sound and bright flash." Option 2 is listed as "quiet sound and no flash." Box 20 is provided merely to demonstrate the choice of the two options for a function, with these options being provided in any of a number of ways, including look-up tables or other means. The master control communicates with a speaker 22 and a light control 24 for performing the functions with the options listed in box 20. The speaker 20 may be the vehicle horn, an alarm speaker, or any other device to create an audible signal. The light control may be a control that controls any or all lights on the vehicle or maybe an auxiliary light of some type.

In use, the transmitter 12 sends a signal to receiver 14. In this example, we will assume the transmitter sends a signal to the receiver indicative of a "unlock" button being pressed on the remote control's transmitter. The receiver communicates to the master control 16 that an "unlock" signal has been received. The master control determines the distance between the transmitter and receiver (or the distance between the transmitter and the vehicle or a factor related to these distances). Depending on the rules programmed into the master control 16, the master control would then determine what options it would use in performing a certain function. In this case, we will assume that the rules provide that the master control chooses option 1 if the distance between the transmitter is greater than a first predetermined distance of approximately 50 feet. The control chooses the second option is the distance is less than a second predetermined distance of approximately 50 feet. The first and second predetermined distances may be different than one another for certain applications. These distance-based rules may instead be based on signal strength or other factors related to distance. For example, option 1 may be chosen if the time elapsed between transmission and receipt of a time signal is greater than a predetermined time and option 2 is chosen if the time elapsed is less than a predetermined time. The master control then signals the speaker 22 and/or light control 24 to perform the options chosen. For example, if the distance is longer than the predetermined distance, option 1 is chosen and the speaker creates a loud sound and the light control creates a bright flash. Additional options may be provided, or the options may be continuous such that the function performed varies continuously or semicontinuously with distance. For example, the volume of the speaker may increase continuously with distance up to the range of the remote control.

The use of multiple options based on distance for various functions of a vehicle may be extended to any other functions of the vehicle, including the alarm system. Further, the actual operation of the system being controlled by the remote control may be altered based on distance. As one example, the disarming of the alarm system and unlocking the doors may be performed in different ways depending on the distance between the remote control and the receiver. In one embodiment, the system determines the distance between the remote control and the receiver when the operator presses either the "unlock" button or the "disarm" button. If the distance is greater than a predetermined distance the system sounds an audible and/or visual confirmatory signal to indicate that the signal was received, but delays actual disarming or unlocking for a period of time to allow the operator to be closer to the car prior to unlocking it. This can provide additional safety benefits as the car does not unlock until the operator is closer. The system may also monitor the distance between the remote control and the receiver. In one embodiment, the operator presses a button to disarm the alarm or unlock the doors and the system checks the distance between the remote control transmitter and receiver. If the distance is greater than a predetermined distance, the system monitors the distance between the transmitter and receiver as the user approaches the vehicle. This may be done in a variety of ways, such as transmitting signals back and forth between the transmitter and receiver (requiring both to be transceivers) so as to continuously monitor the distance. Once the user has approached within a predetermined distance to the car, the system goes ahead and disarms the alarm and unlocks one or more doors.

Referring again to FIG. 3, it will be clear to those of skill in the art that the various components and/or functions described with respect to FIG. 3 are primarily illustrative of their various functions rather than the actual construction of a physical system. The receiver 14 and/or master control 16 and/or alarm and door locking control 18 and/or speaker 22 and/or light control 24 may be integrated into a single unit, or have their functions distributed among discrete components in a manner other than illustrated. Consequently, when the present specification or claim states that a certain component determines the distance between the transmitter and receiver, this determination function may be performed by any of the components in the system, rather than a particular component called out.

As a further aspect of the present invention, one or more functions of a remote control system may be altered based on other factors. For example, a vehicle with a remote control locking system may include an internal or external microphone or sound sensor for sensing ambient noise levels in the area in or around the car. The volume level of an auditory confirmatory signal, in response to a remote control trigger, may be adjusted based on the ambient sound level. If the ambient sound level is very low, as if the vehicle is parked in a quiet residential area, a very low volume, or no volume indicator is triggered. In a very noisy environment, a louder sound level is detected by the microphone and a loud auditory confirmation sound is given in response to the remote control signal.

As yet another aspect of the present invention, one or more functions of the remote control signal may be adjusted based on ambient light level. In this way, a remote control system may be programmed to give a low intensity confirmatory flash of light when the ambient light level is low and a much brighter confirmatory flash of light when ambient light levels are high. If desired, the auditory level could also be adjusted based on ambient light level. In this way, the system can be programmed to give a very quiet or no auditory signal when ambient light levels are low, such as at night, but to give a louder signal during the day.

The present invention has application outside of the automotive industry. As one example, a television with a remote control may include the functionality of the present invention. When the user of the television set is very close to the television, the television may respond to remote control signals differently than when the user is farther away. As one example, if the user turns a television set on from very close to the television, the television may set its initial sound level lower when it comes on. Alternatively, if the user is much farther away, the initial volume setting can be set much higher. Brightness levels may also be initially set based on remote control distance. As one aspect of this embodiment, a remote control may include an "optimize for viewing distance" button on a remote control. A user could press this button when they are seated in their favorite viewing position and the television could adjust its settings according to rules based on what settings are optimal for that viewing distance.

The present invention also has application for audio equipment. In this case, the audio system may alter stereo balance and relative volume levels of various speakers in a room depending upon the position of a remote control. In this way, the user may position themselves in their favorite listening position, press a control on the remote control, such as an "optimize for listening position" button, and have the system automatically alter its settings so as to provide an optimal listening experience at the user's location. This could include adjusting subwoofer or bass levels, equalizer settings, balance, front to rear fade, center channel level, and numerous aspects of surround sound settings. For these later aspects of the present invention, it may be preferred that the remote control system be capable of determining more than just distance between the remote control and the receiver. Instead, it may be preferable to determine two-dimensional or three-dimensional position of the remote control in the listening or viewing space. For this purpose, additional remote control receivers may be provided so that a triangulation may be performed to determine the location of the user. Other location approaches may also be used. For example, signal reflection patterns may be used to help determine location.

As a further aspect of the present invention, remote control function may change depending on the location of the remote control. For example, some home automation systems include remote controls. In this case, certain controls on the remote control may alter their function depending on what room the user is located in. For example, using the volume control on the remote control in the living room adjusts sound level in the living room while using the same remote control in the bedroom causes an adjustment in the volume level in the bedroom.

Alternatives to the disclosed preferred embodiments of the present invention, which do not depart from its scope or teaching, will be clear to those of skill in the art. It is the following claims, including all equivalents, which determine the scope of the present invention.

What is claimed is:

1. A vehicle with a remote control system, comprising:

a vehicle;

a remote control transmitter operable to transmit a signal;

a receiver operable to receive the signal from the remote control transmitter;

a confirmation device operable to selectively produce two or more distinct confirmatory signals;

an ambient noise sensor operable to determine an ambient noise level in the area of the vehicle;

a control device in communication with the receiver and sensor and being operable to control a function of the vehicle in response to the signal from the remote control, the control device further being in communication with and operable to control the confirmation device such that when the receiver receives a signal from the remote control, the control device controls the function of the vehicle and causes the confirmation device to produce one of the confirmatory signals, the confirmatory signal being produced depending on the ambient noise level determined by the sensor.

2. The vehicle according to claim 1, wherein the confirmatory signals include at least two audible signals, a first audible signal being louder than a second audible signal, the control device causing the confirmation device to produce the first audible signal when the ambient noise level in greater than a predetermined level and to produce the second audible signal when the ambient noise level is less than the predetermined level.

3. The vehicle according to claim 1, wherein a first confirmatory signal is an audible signal and a second confirmatory signal is an inaudible signal, the control device causing the confirmation device to produce the first signal when the ambient noise level is greater than a predetermined level and to produce the second signal when the ambient noise level is less than the predetermined level.

4. The vehicle according to claim 1, wherein the function of the vehicle controlled by the control device is a function selected from the group consisting of alarm arming, alarm disarming, door locking, door unlocking, and trunk opening.

5. The vehicle according to claim 2, wherein the ambient noise sensor is a microphone.

6. A method of controlling a remote function comprising:

providing a remote control transmitter and a receiver;

sending a signal from the remote control transmitter to the receiver;

determining the ambient noise level in the area;

performing a first function in response to the signal from the transmitter if the ambient noise level is less than a first predetermined level; and performing a second function in response to the signal from the transmitter if the ambient noise level is greater than a second predetermined level.

7. The method according to claim 6, wherein the first function includes producing a first audible signal and the second function includes producing a second audible signal that is louder than the first audible signal.

8. The method according to claim 6, wherein the first function includes not producing an audible signal and the second function includes producing an audible signal.

9. The method according to claim 6, wherein the first and second predetermined levels are the same level.

10. A method of controlling a remote function comprising:

providing a remote control transmitter and a receiver;

sending a signal from the remote control transmitter to the receiver;

determining an ambient noise level;

performing a function in response to the signal from the remote control transmitter;

producing a first confirmatory signal having an adjustable output level, the output level being adjusted based on the ambient noise level.

11. The method according to claim 10, wherein the confirmatory signal is an audible signal and the signal loudness is adjusted based on the ambient noise level, the loudness increasing with increasing ambient noise level.

12. A remote control system comprising:

a remote control transmitter operable to transmit a signal;

a receiver operable to receive the signal from the remote control transmitter;

an ambient noise sensor operable to determine the ambient noise level;

a control device responsive to the signal received by the receiver and operable to produce an audible signal if the ambient noise level is greater than a first predetermined level and to not produce an audible signal if the ambient noise level is less than a second predetermined level.

13. The remote control system according to claim 12, wherein the control device is further operable to control a function of a vehicle.

14. The remote control system according to claim 12, wherein the first and second predetermined levels are the same level.

15. The remote control system according to claim 12, wherein the ambient noise sensor is a microphone.

* * * * *